United States Patent
Kim

(10) Patent No.: US 8,369,463 B2
(45) Date of Patent: Feb. 5, 2013

(54) RECEIVER APPARATUS IN MULTI-USER COMMUNICATION SYSTEM AND CONTROL METHOD THEREOF

(75) Inventor: Woo-Tae Kim, Daegu (KR)

(73) Assignee: Samsung Electronics Co., Ltd (KR)

(*) Notice: Subject to any disclaimer, the term of this patent is extended or adjusted under 35 U.S.C. 154(b) by 1040 days.

(21) Appl. No.: 12/348,561

(22) Filed: Jan. 5, 2009

(65) Prior Publication Data
US 2009/0175390 A1 Jul. 9, 2009

(30) Foreign Application Priority Data
Jan. 3, 2008 (KR) .................................. 2008/797

(51) Int. Cl.
*H03D 1/00* (2006.01)
*H04L 27/14* (2006.01)
(52) U.S. Cl. ........................ 375/341; 375/262
(58) Field of Classification Search .................. 375/341
See application file for complete search history.

(56) References Cited

U.S. PATENT DOCUMENTS

| | | | | |
|---|---|---|---|---|
| 2005/0278603 | A1* | 12/2005 | Berens et al. | 714/755 |
| 2007/0079223 | A1* | 4/2007 | Mondin et al. | 714/780 |
| 2007/0226599 | A1* | 9/2007 | Motwani | 714/792 |
| 2009/0290667 | A1* | 11/2009 | McElwain | 375/350 |

FOREIGN PATENT DOCUMENTS

| | | |
|---|---|---|
| EP | 1 775 869 | 4/2007 |
| JP | 2007-151093 | 6/2007 |

* cited by examiner

*Primary Examiner* — Erin File
(74) *Attorney, Agent, or Firm* — The Farrell Law Firm, P.C.

(57) ABSTRACT

A receiver apparatus in a multi-user communication system and a control method are provided. The receiver apparatus includes a multi-user detector for creating a soft decision value by using multiple received signals and priori information output from a prior iteration, and a channel decoder for performing local iterative decoding on the soft decision value created by the multi-user detector, and updating the soft decision value. The receiver apparatus also includes a global decoding controller for checking the soft decision value updated by the channel decoder, and controlling whether or not to perform global iterative decoding. Accordingly, it is possible to minimize a processing time delay and to reduce the complexity through an interference cancellation processing for multiple user signals and an iterative decoding processing, and also it is possible to minimize the decoding delays of user signals by processing soft decision values for multiple user signals as many as a predetermined number of decoding iterations before terminating.

11 Claims, 6 Drawing Sheets

RECEIVER APPARATUS IN MULTI-USER COMMUNICATION SYSTEM AND CONTROL METHOD THEREOF

PRIORITY

This application claims priority under 35 U.S.C. §119(a) to application entitled "Receiver Apparatus In Multi-User Communication System And Control Method Thereof" filed with the Korean Intellectual Property Office on Jan. 3, 2008 and assigned Serial No. 2008-797, the contents of which are incorporated herein by reference.

BACKGROUND OF THE INVENTION

1. Field of the Invention

The present invention relates generally to a receiver apparatus in a multi-user communication system and a control method thereof, and more particularly, to a receiver apparatus that can minimize a processing time delay and can reduce the complexity through interference cancellation processing for multiple user signals and iterative decoding processing.

2. Description of the Related Art

Portable phone service was introduced in the 1980's, and experienced explosive expansion in the early 1990's. In order to efficiently use limited frequency resources, analog-type portable phone service was replaced with digital-type portable phone service. Third-generation mobile phone service that enables the user to perform various data communication with anybody regardless of time and place is expected to be provided in the near future.

The digital portable phone systems include the Global System for Mobile communication (GSM) using the Time Division Multiple Access (TDMA) scheme, which is commercialized in Europe, and IS-95 using the Code Division Multiple Access (CDMA) scheme, which is adopted and provided as a standard in North America and Korea. The IS-95 provided in Korea is characterized by a large accommodation capacity and a soft handover between base stations, which are the advantages of the CDMA scheme, and is highlighted as a basic form for the standard of the third-generation portable phone method expected to be provided in the future.

Since commercial use of the digital portable phone service began, various studies have been made to expand the receptive capacity of the system, which is the most basic requirement. Riding on such a technical requirement, various methods for increasing the receptive capacity of a CDMA system have been introduced in the last several years. Studies about an interference cancellation method, which is one of the introduced methods, have been made and are being made from various viewpoints.

While early studies focused on an analysis for an optimum multi-user detector, more recent studies have given greater attention to how to actually implement an interference cancellation method. With the development of hardware technology, some interference cancellation methods are expected to be applied to the third-generation mobile communication system.

Generally, interference cancellation methods are classified into a Serial Interference Cancellation (SIC) scheme, a Parallel Interference Cancellation (PIC) scheme, and a Hybrid Interference Cancellation (HIC) scheme. The SIC scheme arranges the interference signals of multiple users in order of power, cancels the interference signals step by step. The SIC scheme can provide a superior detection result for a user signal having high power than other schemes, but has a disadvantage in that a delay time for interference cancellation becomes longer because it is necessary to cancel the respective user signals one by one.

The PIC scheme cancels interference signals in parallel with respect to all user signals, and thus has an advantage in that a delay time is significantly reduced as compared with the SIC scheme. However, according to the PIC scheme, since many interference signals are estimated and canceled at one time, a large error occurs when there is an inaccurately estimated interference signal, thereby degrading the performance. Finally, the HIC scheme combines the SIC scheme and the PIC scheme in order to appropriately utilize the advantages of both schemes.

When an interference cancellation scheme is applied to a Wideband CDMA (WCDMA) system taking a channel code into consideration, it is preferable to use a powerful channel code because the gain of a channel code is directly related to the gain of the interference cancellation scheme.

As full-scale multimedia services, such as images and a wireless Internet, are provided as mobile communication services, it becomes necessary to achieve low Bit Error Rate (BER) performance as well as high-speed transmission. To this end, research about error correction schemes and performance enhancement has been actively conducted, so that a turbo code has been adopted as an error correction code for the next-generation mobile communication systems, such as High Speed Downlink Packet Access (HSDPA), Wireless Broadband (WiBro), etc. The turbo code basically has a structure obtained by concatenating convolutional codes in a parallel fashion. This is to apply two or more sequences, such as component codes, having mutually different arrangements.

The originally-studied parallel concatenation code, which is used in such a dual coding scheme as to code a sequence to be transmitted by applying a code, and to again code the coded sequence by applying another code, differs from a newly proposed turbo code. The newly proposed turbo code creates a second sequence by changing only the arrangement of a first sequence and to apply the first and second sequences to mutually different coders.

The turbo code uses a soft-output iterative decoding scheme as a decoding scheme. Since the goal of the turbo code decoding is to improve the performance by exchanging information about each bit within a decoding period and using the information at the next decoding in order to improve the performance, it is necessary to obtain a soft output in a turbo code decoding step. To this end, a Maximum A Posteriori (MAP) algorithm is used.

The performance of a turbo code is determined by the number of memories in a decoder, a block size, a type of interleaving, a decoding algorithm of the decoder, the number of iterations, the number of processing bits used for an internal metric, etc. Error correction codes are roughly classified into two types, that is, into a Low Density Parity Check (LDPC) code series and a turbo-likely code series. The LDPC series has the form of a parity check matrix, and the turbo-likely code series has a form concatenated through an interleaver.

In codes using the iterative decoding, a predetermined maximum number of decoding iterations is important, and functions to determine the decoding throughput of the entire system. Even in the case of a decoder employing an iterative decoding stop criterion algorithm, a maximum number of decoding iterations predetermined in the system is still important because it is possible to iterate the decoding as many as the maximum number of decoding iterations according to frame data to be decoded.

FIG. 1 is a block diagram illustrating the configuration of a conventional turbo decoder, which basically includes a first internal decoder 101, an interleaver 102, a second internal decoder 103, a de-interleaver 104, and a hard decision unit 105.

Explaining the operation of the conventional turbo decoder in short, values input to the first and second decoders 101 and 103 include a system input signal, first and second additional input signals, and an external information value. When the system input signal, the first additional input signal, and the external information value are input to the first decoder 101, the input signals are subjected to a first decoding process through the first internal decoder 101, so that a soft decision value is output. The soft decision value obtained through the first decoding process passes through the interleaver 102, and is then input to the second decoder 103 together with the second additional input signal, thereby being again subjected to a decoding process.

Such a decoding process is iteratively performed until a desired performance has been obtained. Thus, there are essential problems in that, as input signals are subjected to iterative decoding processes and pass through the interleaver 102 and de-interleaver 104, the decoding delay time is longer and the complexity increases. Various apparatuses and methods for reducing the decoding delay time of the problems were proposed, especially, apparatuses and methods for establishing the number of iterations and terminating a decoding procedure based on the number of iterations.

SUMMARY OF THE INVENTION

The present invention has been made to address at least the above problems and/or disadvantages and to provide at least the advantages described below. Accordingly, an aspect of the present invention provides a receiver apparatus in a multi-user communication system, which can minimize a processing time delay and can reduce the complexity through an interference cancellation processing for multiple user signals and an iterative decoding processing, and a control method thereof.

Another aspect of the present invention provides a receiver apparatus which can minimize the decoding delays of user signals by processing soft decision values for multiple user signals as many as a predetermined number of decoding iterations before terminating, and a control method thereof.

According to one aspect of the present invention, a receiver apparatus in a multi-user communication system is provided. The receiver apparatus comprises a multi-user detector for creating a soft decision value by using multiple received signals and information output from a prior iteration, and a channel decoder for performing local iterative decoding on the soft decision value created by the multi-user detector, and updating the soft decision value. The receiver also comprises a global decoding controller for checking the soft decision value updated by the channel decoder, and controlling whether to perform global iterative decoding.

According to another aspect of the present invention, a method for reception control in a multi-user communication system is provided. A soft decision value for each user signal is created using multiple received signals and information output from a prior iteration. Local iterative decoding is performed on the soft decision value, and the soft decision value is updated. The updated soft decision value is checked, and whether or not to perform global iterative decoding is controlled.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF THE PREFERRED EMBODIMENT

Figure 1:
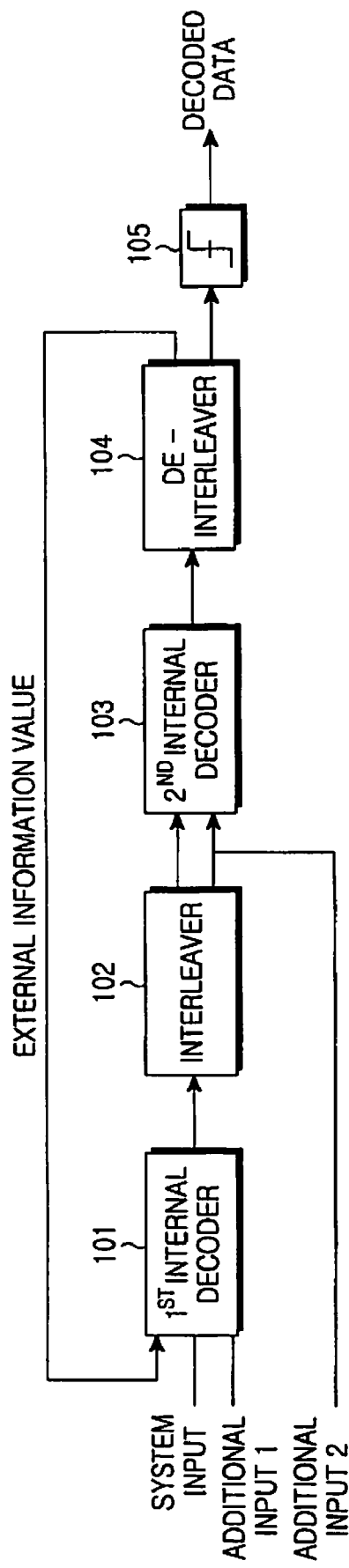
FIG. 1 is a block diagram illustrating the configuration of a conventional turbo decoder.

Preferred embodiments of the present invention are described in detail with reference to the accompanying drawings. Similar components are designated by similar reference numerals although they are illustrated in different drawings. Detailed descriptions of constructions of processes known in the art may be omitted to avoid obscuring the subject matter of the present invention.

Figure 2:
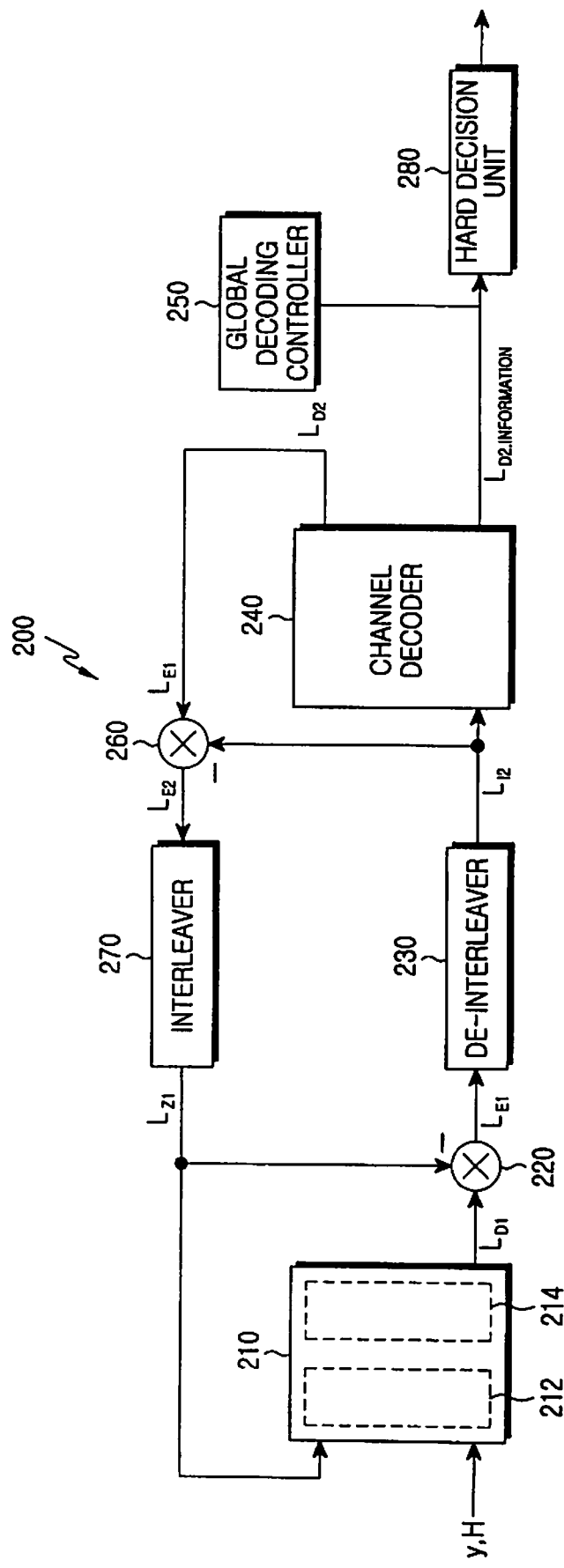
FIG. 2 is a block diagram illustrating the configuration of a receiver apparatus in a multi-user communication system according to an embodiment of the present invention.

FIG. 2 is a block diagram illustrating the configuration of a receiver apparatus in a multi-user communication system according to an embodiment of the present invention.

A receiver apparatus 200 in the multi-user communication system includes a multi-user detector 210, a first calculation unit 220, a de-interleaver 230, a channel decoder 240, a global decoding controller 250, a second calculation unit 260, an interleaver 270, and a hard decision unit 280.

The multi-user detector 210 includes an interference cancellation unit 212 and a bandpass unit 214 so as to remove an interference signal from multiple received signals by applying a PIC scheme, and to detect the signal components of each user.

The interference cancellation unit 212 cancels an interference signal of each user signal from multiple user signals, which share an equal channel and are mixed to each other, thereby detecting each user signal.

The bandpass unit 214 removes an interference component remaining in each user signal, and can be adapted based on a Minimum Mean Square Error (MMSE).

The multi-user detector 210 calculates first posteriori information "LD1" for each bit by using each user signal "y, H" and first priori information "LI1" output from a prior iteration. In this case, the first posteriori information "LD1" has a Log Likelihood Ratio (LLR), which is a first soft decision value, as shown in equation 1 below. Here, the first priori information "LI1" represents a feedback signal, wherein both the probability that the first priori information "LI1" is "+1" and the probability that the first priori information "LI1" is "−1" are initialized to ½ upon the first iteration because there is no first priori information "LI1."

$$L_{D1}(c_k \mid y) = \ln \frac{P[c_k = +1 \mid y]}{P[c_k = -1 \mid y]} \quad (1)$$

In Equation (1), "y" represents a received signal vector, and "$c_k$" represents a $k^{th}$ bit of the received signal. In addition, "P[$c_k$=+1|y]" represents a probability that a $k^{th}$ bit has a value of "+1" when a signal vector "y" has been received.

The first calculation unit 220 calculates first external information "LE1" by using a difference between the first posteriori information "LD1" detected by the multi-user detector 210 and the first priori information "LI1."

In this case, since the first posteriori information "LD1" detected by the multi-user detector 210 corresponds to a sum of the first priori information "LI1" and the first external information "LE1," as shown in Equation (2) below, the first external information "LE1" can be calculated by a difference between the first posteriori information "LD1"and the first priori information "LI1." When the first external information "LEI" is first calculated, the first external information "LE1" has the same value as the first posteriori information "LD1" because there is no first priori information "LI1."

$$\begin{aligned} L_{D1}(c_k \mid y) &= \ln \frac{P[c_k = +1 \mid y]}{P[c_k = -1 \mid y]} \\ &= \ln \frac{P[c_k = +1]}{P[c_k = -1]} + \ln \frac{P[y \mid c_k = +1]}{P[y \mid c_k = -1]} \\ &= L_{I1}(c_k) + L_{E1}(c_k \mid y) \end{aligned} \quad (2)$$

In Equation (2), "$L_{I1}(c_k)$" represents the first priori information "LI1," and "$L_{E1}(c_k)$" represents the first external information. In addition, "P($c_k$=+1)" represents a probability that a $k^{th}$ bit has a value of "+1."

The de-interleaver 230 performs a de-interleaving operation, corresponding to the interleaving rule of the interleaver 270 shown in FIG. 2, with respect to the first external information "LE1" output from the first calculation unit 220, thereby creating and outputting second priori information "LI2."

The channel decoder 240 decodes the second priori information "LI2," which has been received from the de-interleaver 230, according to a predetermined decoding scheme, i.e., aMAP algorithm, thereby creating second posteriori information "LD2." For example, each decoding node included in the channel decoder 240 may update the second priori information "LI2" and perform local iterative decoding. In this case, the second posteriori information "LD2" is a second soft decision value (LLR), which corresponds to a soft decision value (LLR) as shown in Equation (1).

The channel decoder 240 may use a Log-MAP (LMAP) algorithm, a Max-Log-MAP (MLMAP) algorithm, etc. for the decoding operation.

The LMAP algorithm is a version of MAP algorithm that is implemented on a log domain, which is an optimal algorithm for decoding an information word on a trellis. The MLMAP algorithm is a version of the LMAP algorithm, however the MLMAP algorithm is more simply implemented than the LMAP algorithm through approximation in a metric operation process.

The global decoding controller 250 checks the second soft decision value (LLR) output from the channel decoder 240, and controls whether to perform global iterative decoding for each bit.

Also, whenever each decoding node included in the channel decoder 240 updates the second priori information "LI2," i.e. a soft decision value (LLR), the global decoding controller 250 determines the reliability of the updated value and determines if a feedback is to be performed. In addition, the global decoding controller 250 controls global iterative decoding to be performed while the global decoding controller 250 exchanges information with a local decoding controller.

Figure 3:
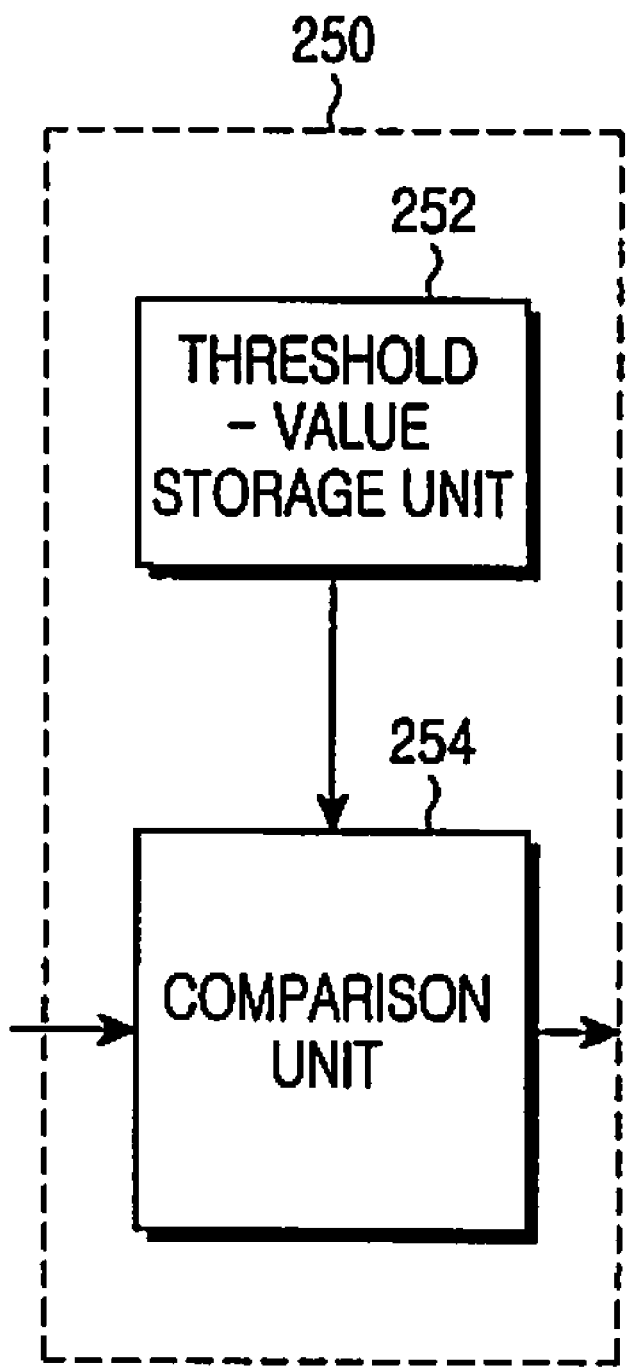
FIG. 3 is a block diagram illustrating the global decoding controller shown in FIG. 2, according to an embodiment of the present invention.

FIG. 3 is a block diagram illustrating the global decoding controller shown in FIG. 2, wherein the global decoding controller includes a threshold-value storage unit and a comparison unit.

A threshold-value storage unit 252, which is a storage means of the global decoding controller 250, is a memory for storing a soft decision value (LLR) output through the first iteration process, and storing a termination threshold value to determine the termination of global iterative decoding based on a simulation.

The termination threshold value stored in the threshold-value storage unit 252 is a constant corresponding to a BER of $10^{-5}$ to $10^{-6}$ required by the system, and a soft decision value of a turbo code determined according to requirements of the system is stored as the termination threshold value.

A comparison unit 254 compares a soft decision value output through the current global iterative decoding process with the termination threshold value stored in the threshold-value storage unit 252. When it is determined that the currently output soft decision value is less than the termination threshold value as a result of the comparison, the comparison unit 254 outputs a termination signal indicating that the global iterative decoding procedure is terminated after the current global iterative decoding has been performed. That is, when the number of iterations arrives at the number of times preset through a simulation, the global iterative decoding for a corresponding bit is terminated.

In contrast, when the currently output soft decision value is equal to or greater than the termination threshold value, the comparison unit 254 outputs a termination signal indicating that the global iterative decoding for a corresponding bit is terminated.

The second calculation unit 260 calculates second external information by a difference between the second posteriori information (i.e. second soft decision value) provided from the channel decoder 240 and the second priori information provided from the de-interleaver 230.

The interleaver 270 performs an interleaving operation on the second external information provided from the second calculation unit 260 according to predetermined rules, thereby creating and outputting first priori information. A random interleaver shows the best performance as the interleaver 270, and an interleaver of a larger size shows a superior performance.

The hard decision unit 280 determines hard decision values of bits according to a result of iterative decoding from the channel decoder 240, and outputs the hard decision values.

As described above, in order to iteratively perform detection and decoding operations between the multi-user detector 210 and the channel decoder 240, first, the multi-user detector 210 creates priori information of each user signal from a received signal, and outputs the created priori information. Thereafter, the channel decoder 240 performs a decoding operation at each decoding node by using the priori information, returns a soft decision value obtained through the decoding operation to the multi-user detector 210, and these processes are repeated.

Figure 4:
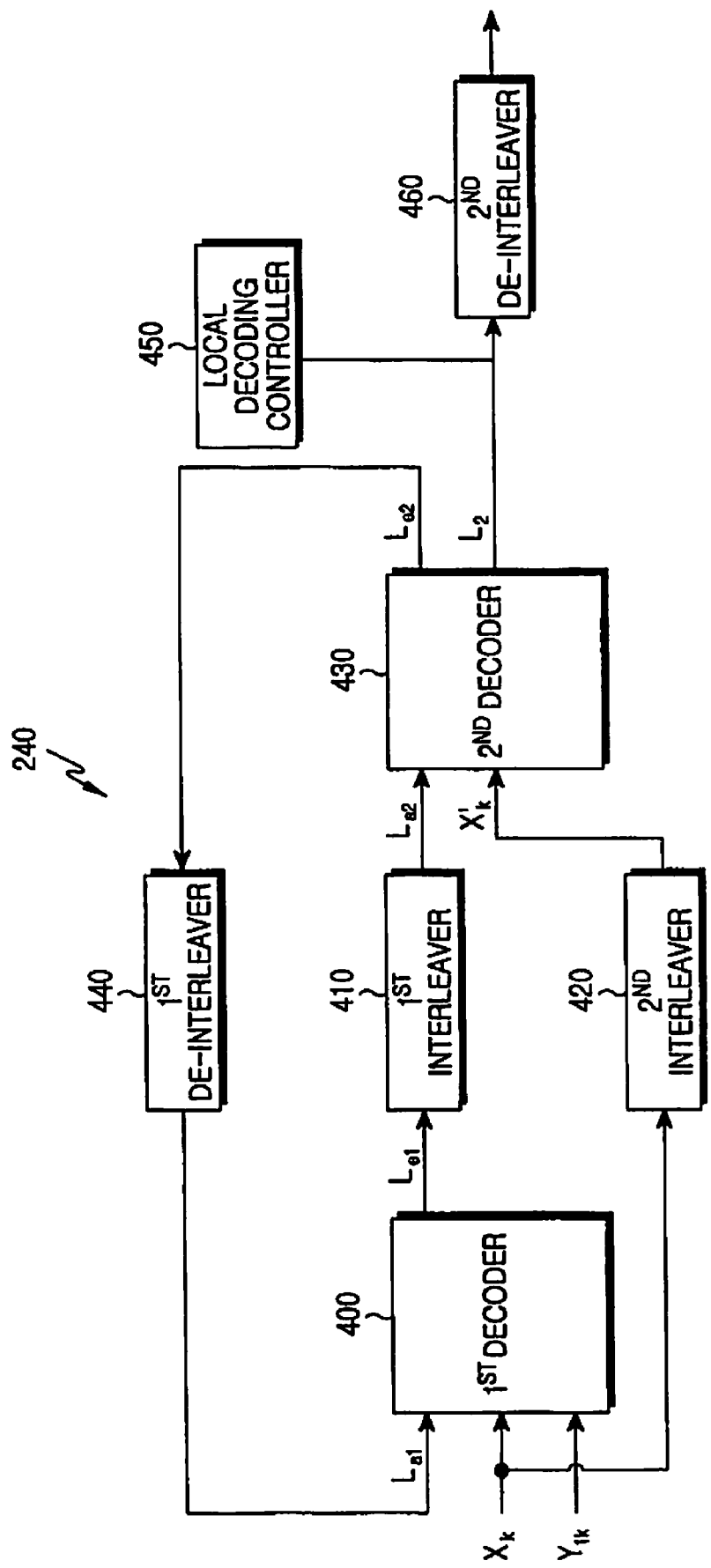
FIG. 4 is a detailed block diagram illustrating the configuration of the channel decoder shown in FIG. 2, according to an embodiment of the present invention.

FIG. 4 is a detailed block diagram illustrating the configuration of the channel decoder shown in FIG. 2.

The channel decoder 240 according to an embodiment of the present invention includes a first decoder 400, a second decoder 430, a first interleaver 410, a second interleaver 420, a first de-interleaver 440, and a second de-interleaver 460.

The first decoder 400 creates a first soft decision value "Le1," by using received second priori information "$X_k$" and first external information "La1" output from a prior iteration.

The first interleaver 410 rearranges and outputs the first soft decision value as second external information "La2."

The second interleaver 420 rearranges and outputs the received information "$X_k$" as information "$X'_k$."

The second decoder 430 creates a second soft decision value "Le2" by using the rearranged information "$X'_k$" and the second external information "La2."

The first de-interleaver 440 creates first external information "La1" by rearranging the second soft decision value "Le2," and feeds the first external information "La1" back to the first decoder 400.

A local decoding controller 450 controls local iterative decoding for the second soft decision value "Le2" of the second decoder 430 to be performed as many as a predetermined number of times according to the global iterative decoding performed by the global decoding controller 250, thereby outputting a required BER performance "L2."

The number of local iterations for the decoding process performed by the channel decoder 240 may be preset, or may be determined by an operation of the global decoding controller 250. In this case, a target threshold value showing the best performance may be calculated by a simulation.

The second de-interleaver 460 rearranges and outputs the local iterative decoding result value "L2," received from the second decoder 430, to the hard decision unit 280.

FIGS. 5A to 5D are graphs explaining performance evaluation through a numerical simulation of the algorithm of the present invention under a fading channel environment according to an embodiment of the present invention.

A system for the simulation was configured such that data could be transmitted at a data rate of 144 kbps in the 2.0 GHz band according to the standard of the WCDMA system. The system supports various frame lengths and code rates, and can have various data rates. A Max-Log-MAP algorithm was applied, and a Rayleigh fading channel environment is used. The length of an interleaver was "SPAN 200," which is approximately 30 times longer than 1024, and a block interleaver having a depth of 150 was used. The simulation was performed while changing the number of local iterations from one to five, and the number of global iterations from one to four, wherein a code rate of ½ was employed.

Figure 5:
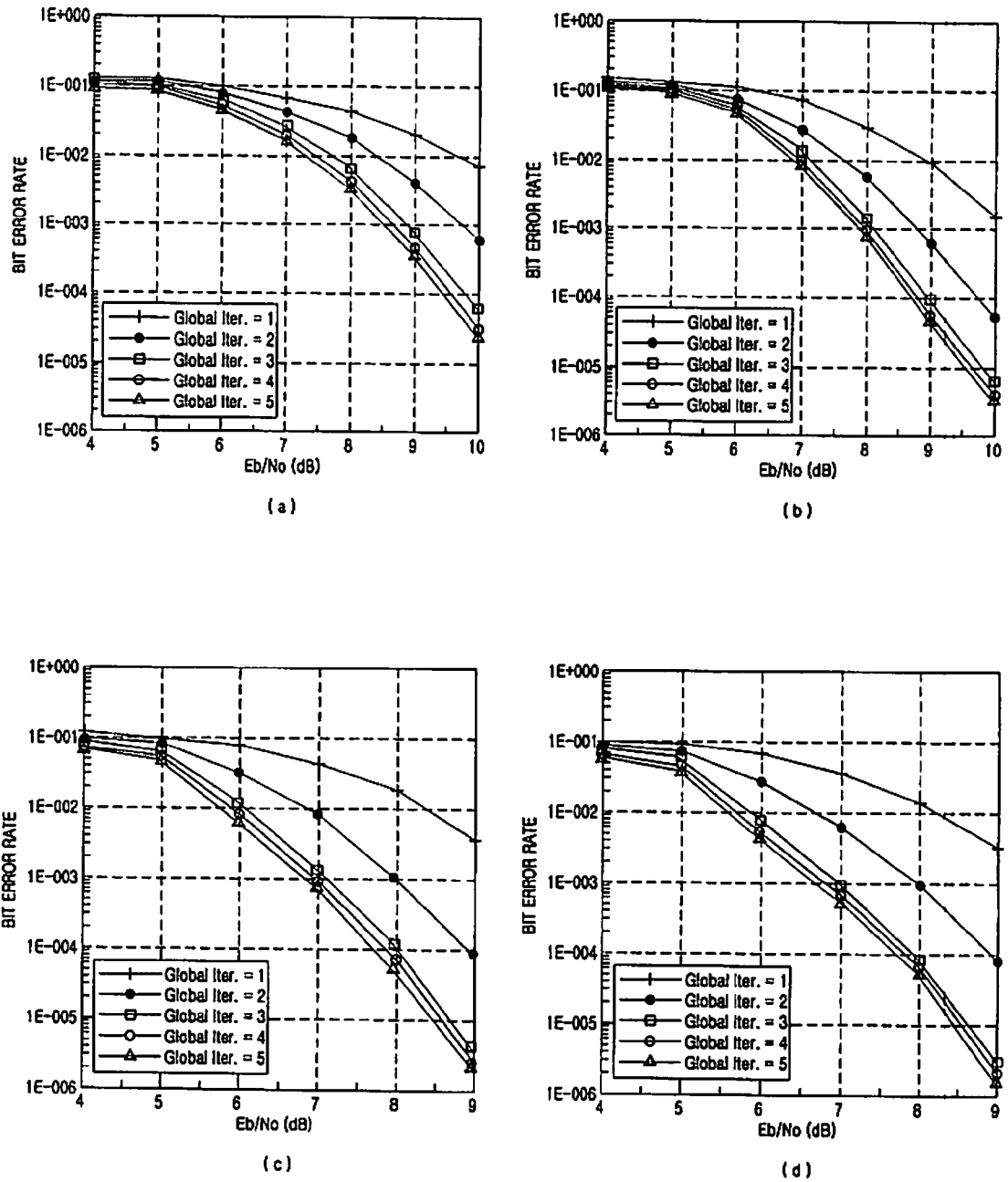
FIGS. 5A to 5D are graphs illustrating performance evaluation through a numerical simulation of the algorithm of the present invention under a fading channel environment according to an embodiment of the present invention.

Results of the algorithm according to the present invention will now be described with reference to FIGS. 5A to 5D. Referring to FIG. 5A, when the number of global decoding iterations was set to three, a performance gain of approximately 10.5 dB was obtained in the BER range of $10^{-5}$ to $10^{-6}$ according to local iterative decoding.

Referring to FIG. 5B, when the number of global decoding iterations was set to three, a performance gain of approximately 9.9 dB was obtained in the BER range of $10^{-5}$ to $10^{-6}$ according to local iterative decoding.

Referring to FIG. 5C, when the number of global decoding iterations was set to three, a performance gain of approximately 8.8 dB was obtained in the BER range of $10^{-5}$ to $10^{-6}$ according to local iterative decoding.

Referring to FIG. 5D, when the number of global decoding iterations was set to three, a performance gain of approximately 8.6 dB was obtained in the BER range of $10^{-5}$ to $10^{-6}$ according to local iterative decoding.

However, a performance difference between when the number of local iterations was set to three (the case of FIG. 5C) and when the number of local iterations was set to four (the case of FIG. 5D) is relatively slight. As shown in FIGS. 5A to 5D, when the number of global decoding iterations was greater than three, there was no significant performance improvement, as opposed to the case where the number of global decoding iterations was changed from one to three. Accordingly, it can be understood that, when the number of local decoding iterations is greater than three and the number of global decoding iterations is greater than three under the Rayleigh fading channel environment, the performance improvement by iteration is saturated. Therefore, in terms of an optimal number of decoding iterations taking error performance into consideration, it is suitable that both the number of global decoding iterations and the number of local decoding iterations are set to three.

Figure 6:
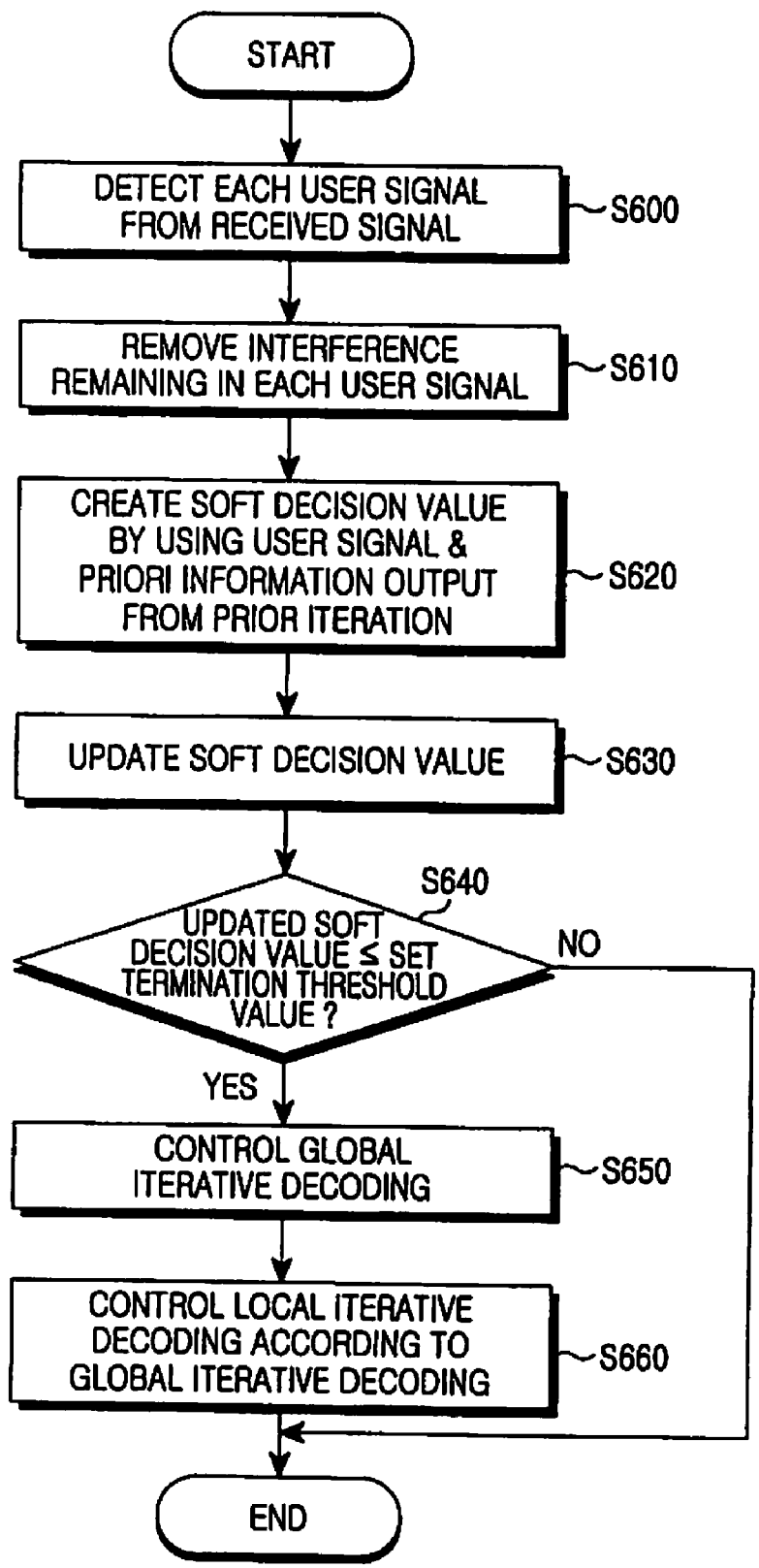
FIG. 6 is a flowchart illustrating the operation of the receiver apparatus in a multi-user communication system according to an embodiment of the present invention.

FIG. 6 is a flowchart illustrating the operation of the receiver apparatus in a multi-user communication system according to an embodiment of the present invention.

The multi-user detector 210 in the receiver apparatus 200 according to an embodiment of the present invention cancels interference signals from multiple signals received from an exterior by applying a PIC scheme, and detects signal components of each user in step 600.

Then, the multi-user detector 210 removes an interference component remaining in each user signal through the bandpass unit 214 in step 610, and creates a soft decision value of each user signal by using the user signal and priori information "LI1" output from a prior iteration in step 620.

Thereafter, the channel decoder 240 updates the created soft decision value through local iterative decoding for the soft decision value in step 630.

The global decoding controller 250 checks the soft decision value updated through the local iterative decoding, and compares the updated soft decision value with a termination threshold value stored in the threshold-value storage unit 252 in step 640. Then, the global decoding controller 250 controls whether or not to perform global iterative decoding in step 650 according to a result of the comparison in step 640. In this case, when the updated soft decision value is less than the termination threshold value, the global decoding controller 250 outputs a termination signal indicating that the procedure is terminated after the global iterative decoding has been performed.

Also, in this case, the local decoding controller 450 controls local iterative decoding for a soft decision value of the channel decoder 240 to be performed as many as a predetermined number of times according to the global iterative decoding performed by the global decoding controller as it has been determined that the global iterative decoding is to be performed, (step 660), thereby outputting a required BER performance "L2." That is, it can be understood through a simulation that the best performance can be obtained by terminating local iterative decoding for a corresponding bit when the number of iterations arrives at a value preset through the simulation, as shown in FIGS. 5A to 5D.

In contrast, when a soft decision value output in the current global iterative decoding process is greater than or equal to the termination threshold value, the global iterative decoding for a corresponding bit is terminated.

Thereafter, a hard decision is performed on external information values obtained as many as a preset number of iterations, thereby outputting a finally decoded result in step 680.

As described above, the present invention can minimize a processing time delay and reduce the complexity through an interference cancellation processing for multiple user signals and an iterative decoding processing, and also can minimize the decoding delays of user signals by processing soft decision values for multiple user signals as many as a predetermined number of decoding iterations before terminating.

The receiver apparatus in a multi-user communication system and a control method thereof according to an exemplary embodiment of the present invention can be implemented as described above.

While the present invention has been shown and described with reference to certain preferred embodiments thereof, it will be understood by those skilled in the art that various changes in form and details may be made therein without departing from the spirit and scope of the invention as defined by the appended claims.

What is claimed is:

1. A receiver apparatus in a multi-user communication system, the receiver apparatus comprising:
    a multi-user detector for creating a soft decision value using a plurality of received signals and information output from a prior iteration of a decoding process;
    a channel decoder for performing local iterative decoding on the soft decision value created by the multi-user detector, for updating the soft decision value, and for controlling local iterative decoding for the soft decision value according to a global iterative decoding; and
    a global decoding controller for checking the soft decision value updated by the channel decoder, and for controlling whether or not to perform the global iterative decoding.

2. The receiver apparatus as claimed in claim 1, wherein the multi-user detector comprises:
    an interference cancellation unit for detecting each user signal by applying a parallel interference cancellation scheme to the plurality of received signals; and
    a bandpass unit for removing an interference component remaining in each user signal.

3. The receiver apparatus as claimed in claim 1, wherein the soft decision value corresponds to a log likelihood ratio.

4. The receiver apparatus as claimed in claim 1, wherein the global decoding controller comprises:
    a threshold-value storage unit for storing a termination threshold value to determine a termination of global iterative decoding based on a simulation; and
    a comparison unit for comparing a soft decision value output through the global iterative decoding operation with the termination threshold value stored in the threshold-value storage unit, and for outputting a termination signal indicating termination of the global iterative decoding according to a result of the comparison.

5. The receiver apparatus as claimed in claim 4, wherein the comparison unit performs a termination operation after performing the global iterative decoding when the soft decision value is less than the threshold value, and terminates the global iterative decoding for a corresponding bit when the soft decision value is greater than or equal to the threshold value.

6. The receiver apparatus as claimed in claim 1, wherein the channel decoder comprises a local decoding controller for controlling local iterative decoding for the soft decision value to be performed as many as a predetermined number of times according to global iterative decoding performed by the global decoding controller.

7. The receiver apparatus as claimed in claim 1, further comprising:
    a de-interleaver for performing a de-interleaving operation on the soft decision value created by the multi-user detector, and for providing the de-interleaved soft decision value to the channel decoder; and
    an interleaver for performing an interleaving operation on the soft decision value feedback from the channel decoder, and for providing the interleaved soft decision value to the multi-user detector.

8. A method for reception control in a multi-user communication system, the method comprising the steps of:
    creating a soft decision value for each user signal using a plurality of received signals and information output from a prior iteration of a decoding process;
    performing local iterative decoding on the soft decision value, and updating the soft decision value;
    controlling local iterative decoding for the soft decision value according to the global iterative decoding; and
    checking the updated soft decision value, and controlling whether to perform global iterative decoding.

9. The method as claimed in claim 8, wherein creating a soft decision value comprises:
    canceling an interference by applying a parallel interference cancellation scheme to the plurality of received signals, and detecting each user signal component; and
    removing an interference component remaining in each user signal.

10. The method as claimed in claim 8, wherein controlling the global iterative decoding comprises:
    comparing the soft decision value updated through the local iterative decoding operation with a termination threshold value stored in a threshold-value storage unit;
    performing a termination operation after performing global iterative decoding as many as a predetermined number of times when the soft decision value is less than the threshold value; and
    terminating global iterative decoding for a corresponding bit when the soft decision value is greater than or equal to the threshold value.

11. The method as claimed in claim 8, wherein a number of the local decoding iterations is determined according to the global iterative decoding.

* * * * *